US008544324B2

(12) United States Patent
Michalewicz et al.

(10) Patent No.: US 8,544,324 B2
(45) Date of Patent: Oct. 1, 2013

(54) QUANTUM TUNNELLING SENSOR DEVICE AND METHOD

(75) Inventors: Marek Michalewicz, Singapore (SG); Peter Slodowy, Victoria (AU)

(73) Assignee: Pilsne Research Co., L.L.C., Wilmington, DE (US)

( * ) Notice: Subject to any disclaimer, the term of this patent is extended or adjusted under 35 U.S.C. 154(b) by 537 days.

(21) Appl. No.: 12/674,840

(22) PCT Filed: Aug. 24, 2007

(86) PCT No.: PCT/SG2007/000278
§ 371 (c)(1),
(2), (4) Date: Aug. 23, 2010

(87) PCT Pub. No.: WO2009/029043
PCT Pub. Date: Mar. 5, 2009

(65) Prior Publication Data
US 2011/0043229 A1    Feb. 24, 2011

(51) Int. Cl.
*G01P 15/08* (2006.01)
*G01B 5/28* (2006.01)

(52) U.S. Cl.
USPC .................. 73/514.16; 73/514.25; 73/105

(58) Field of Classification Search
USPC ............. 73/514.01, 514.16, 514.32, 862.625, 73/514.25, 105; 250/423 F; 850/1–4, 7, 850/10–11, 15, 19
See application file for complete search history.

(56) References Cited

U.S. PATENT DOCUMENTS

| | | | |
|---|---|---|---|
| 4,638,669 A * | 1/1987 | Chou | 73/514.25 |
| 4,806,755 A * | 2/1989 | Duerig et al. | 850/7 |
| 4,987,303 A | 1/1991 | Takase et al. | |
| 5,079,958 A * | 1/1992 | Takase et al. | 73/862.625 |
| 5,375,087 A * | 12/1994 | Moreland et al. | 850/10 |
| 5,751,156 A | 5/1998 | Muller et al. | |
| 5,756,895 A | 5/1998 | Kubena et al. | |
| 5,905,202 A * | 5/1999 | Kubena et al. | 73/504.15 |

(Continued)

FOREIGN PATENT DOCUMENTS

| | | |
|---|---|---|
| JP | 9-80060 | 3/1997 |
| WO | WO 96/21157 A1 | 7/1996 |
| WO | WO 00/14476 A1 | 3/2000 |
| WO | WO 2004/094956 A1 | 11/2004 |

OTHER PUBLICATIONS

International Search Report (2 pgs.), Oct. 17, 2007.
Kobayashi et al., "A Micromachined Unit for Tunnel Current Control," Institute of Industrial Science, University of Tokyo, 1995 IEEE, pp. 275-285.
Kobayashi et al., "An Integrated Lateral Tunneling Unit," Micro Electro Mechanical Systems '92, Travemünde (Germany), Feb. 4-7, 1992, pp. 214-219.

(Continued)

*Primary Examiner* — Helen Kwok

(57) ABSTRACT

A sensor device, method of fabricating the same, and a method of sensing a physical quantity. The sensor device comprises a substrate; a flexure member, one end of the flexure member being attached to the substrate, and a free end of the flexure member having an edge surface; a counter surface formed on the substrate such that the counter surface faces the edge surface of the flexure member and such that a separation distance between the counter surface and the edge surface remains substantially constant for movement of the edge surface as a result of flexure of the flexure member, each of the edge surface and the counter surface including one or more conductor layers disposed in a plane substantially perpendicular to a flexure direction of the flexure member; and means for applying an electrical potential difference between the conductors of the edge surface and the conductors of the counter surface for detecting a quantum tunnelling current therebetween.

25 Claims, 6 Drawing Sheets

(56) References Cited

U.S. PATENT DOCUMENTS

| | | | |
|---|---|---|---|
| 5,939,632 A | 8/1999 | Moore et al. | |
| 6,479,920 B1* | 11/2002 | Lal et al. | 310/309 |
| 6,614,243 B2* | 9/2003 | Klehn et al. | 324/754.21 |
| 7,404,338 B2* | 7/2008 | Hierold et al. | 73/862.68 |
| 7,579,149 B2* | 8/2009 | Frommer et al. | 435/6.11 |
| 2002/0178800 A1* | 12/2002 | Hasegawa et al. | 73/105 |
| 2006/0285789 A1* | 12/2006 | Michalewicz et al. | 385/14 |
| 2007/0215480 A1* | 9/2007 | Fang et al. | 205/118 |
| 2007/0285184 A1* | 12/2007 | Eyckmans et al. | 331/107 R |

OTHER PUBLICATIONS

Kobayashi et al., "Control of a Micro Tunneling Unit Under Atomic Force," Institute of Industrial Science, University of Tokyo, 1995 IEEE, pp. 218-223.

Mierosensors Get Tunnelling, Design Engineering, Nov. 1997, p. 13.

Toshiyoshi et al., "Micromechanical Tunneling Probes & Actuators on a Silicon Chip," Microprocesses & Nanotechnology Conference 1999, Digest of Papers, IEEE, 8B-7-2, pp. 180-181.

* cited by examiner

QUANTUM TUNNELLING SENSOR DEVICE AND METHOD

FIELD OF THE INVENTION

The invention relates broadly to a sensor device and method, and to a method of fabricating a sensor device.

BACKGROUND OF THE INVENTION

There have been a number of published proposals for the use of detectable changes in quantum tunnelling current to measure micro- or nano-order displacements. The displacements may be linked to a physical property to be measured.

The existing proposals may be broadly classified into two groups, a first group in which a measurement tip undergoes lateral movement with respect to another electrode, sometimes referred to as Lateral Tunneling Unit (LTU) techniques, and a second group where a flexible proof mass, for example in the form of a free end of a cantilever may be movable in multi-dimensions with reference to a counter electrode. One significant common feature between the existing proposals is that they all rely on a variation in the distance between an electrode on the measurement tip or proof mass and the counter electrode for the detectable variation in the tunneling current.

Examples of the first group include D Kobayashi et al ('An integrated Lateral Tunneling Unit", IEEE 1992, Micro Electro Mechanical Systems 1992, Travemuende (Germany) Feb. 4-7, 1992, p. 214), and H Toshiyoshi et al ('Micromechanical Tunneling Probes & Actuators on a Silicon Chip', IEEE1999, Microprocesses and Nanotechnology Conference 1999, p. 180). An example of the second group is proposed in WO96/21157.

However, since the tunneling current varies exponentially with the distance between the measurement tip or proof mass and the counter electrode, the existing proposals may not be well suited for accurate measurement and monitoring of fine displacements, and in particular of fine incremental displacements.

For example, WO96/21157 discloses a micromechanical accelerometer having a substrate and a proof mass mounted on the substrate. Both are formed of conductive material. The proof mass is a flexible element, having a free end which is a first electrode. It faces a second electrode on the substrate, and circuitry is provided to measure quantum tunneling current between the electrodes when a voltage is applied between them. The gap distance between the electrodes is at an angle to the direction of motion of the free end of the flexure, so that the gap varies as the flexure flexes. In the disclosed accelerometer, the quantum tunneling current thus varies exponentially with the distance between the electrodes.

A need therefore exists to provide a sensor device and method and method of fabricating the same which seek to address the above-mentioned disadvantage of existing proposals.

SUMMARY OF THE INVENTION

In accordance with a first aspect of the present invention there is provided a sensor device comprising a substrate; a flexure member, one end of the flexure member being attached to the substrate, and a free end of the flexure member having an edge surface; a counter surface formed on the substrate such that the counter surface faces the edge surface of the flexure member and such that a separation distance between the counter surface and the edge surface remains substantially constant for movement of the edge surface as a result of flexure of the flexure member, each of the edge surface and the counter surface including one or more conductor layers disposed in a plane substantially perpendicular to a flexure direction of the flexure member; and means for applying an electrical potential difference between the conductors of the edge surface and the conductors of the counter surface for detecting a quantum tunnelling current therebetween.

The conductor layers of the edge surface and the counter surface may extend through to respective edge portions of the substrate for applying the electrical potential.

Insulating layers may be provided between the conductor layers of the edge surface, the counter surface, or both.

The flexure direction may be substantially perpendicular to the substrate.

The flexure direction may be substantially parallel to the substrate.

The flexure member may be formed across a recess formed in the substrate, and the counter surface is formed as part of a wall structure of the recess.

The recess may have an exposed longitudinal edge along at least one side of the substrate.

One side of the flexure member may be aligned with said exposed edge of the recess.

The recess may be laterally enclosed along all sides of the recess.

The device may further comprise a tip formed on a surface of the flexure member.

The flexure member and the counter surface may be built up on a surface of the substrate, and a frame portion of the substrate may extend around at least one longitudinal side of the flexure member.

The counter surface may extend below, above, or both, of a quiescent level of the flexure member along the flexure direction.

In accordance with a second aspect of the present invention there is provided a method of sensing a physical quantity, the method comprising the steps of providing a flexure member, one end of the flexure member being attached to a substrate, and a free end of the flexure member having an edge surface; providing a counter surface formed on the substrate such that the counter surface faces the edge surface of the flexure member, each of the edge surface and the counter surface including one or more conductor layers disposed in a plane substantially perpendicular to a flexure direction of the flexure member; applying an electrical potential difference between the conductors of the edge surface and the conductors of the counter surface for detecting a quantum tunnelling current therebetween; flexing the flexure member such that a separation distance between the counter surface and the edge surface remains substantially constant for movement of the edge surface as a result of flexure of the flexure member; detecting the tunnelling current for sensing the physical quantity; and wherein movement of the flexure member or vibratory properties of the flexure member are coupled to the physical quantity.

In accordance with a third aspect of the present invention there is provided a method of fabricating a sensor device, the method comprising the steps of providing a substrate; forming a flexure member, one end of the flexure member being attached to the substrate, and a free end of the flexure member having an edge surface; forming a counter surface on the substrate such that the counter surface faces the edge surface of the flexure member and such that a separation distance between the counter surface and the edge surface remains substantially constant for movement of the edge surface as a result of flexure of the flexure member, each of the edge surface and the counter surface including one or more conductor layers disposed in a plane substantially perpendicular to a flexure direction of the flexure member; and forming means for applying an electrical potential difference between the conductors of the edge surface and the conductors of the counter surface for detecting a quantum tunnelling current therebetween.

BRIEF DESCRIPTION OF THE DRAWINGS

Example embodiments of the present invention will now be described, by way of example only, with reference to the accompanying drawings, in which:

FIG. 1b shows a schematic top view of the sensor device of FIG. 1a.

DETAILED DESCRIPTION

Figure 1A:
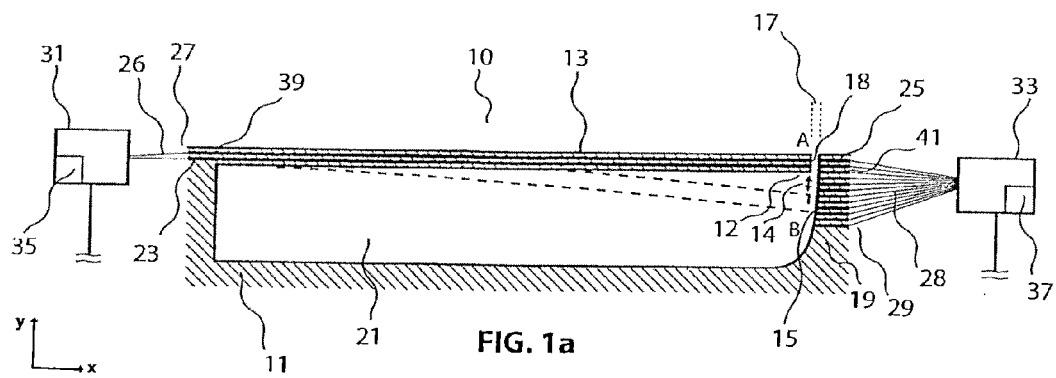
FIG. 1a shows a schematic cross-sectional view of a sensor device according to an example embodiment.

An embodiment 10 of the invention is depicted in FIGS. 1a and b. As shown in the cross-sectional view of FIG. 1a, the embodiment 10 comprises a flexure 13 and an insulating or semi-conducting substrate 11. In the embodiment 10, the flexure 13 is an elongate plate. One end of the flexure plate 13 is attached to the substrate 11 and the opposite end 12 of the flexure plate 13 is free to move. The flexure plate 13 has a low degree of in-plane stiffness such that, under a force, the flexure plate 13 flexes with the free end 12 moving in a direction substantially perpendicular to the plane of the major surfaces of the substrate 11, as indicated by arrow 14. The substrate 11 generally defines a recess 21 underneath the flexure plate 13. In a quiescent condition, the upper surface of the flexure plate 13 is parallel to the plane of the major surfaces of the substrate 11.

With reference to FIGS. 1a and b, the free end 12 of the flexure plate 13 faces a counter surface 15 defined on the substrate 11, with a gap 17 therebetween in the range of a few tenths of a nanometer to tens of nanometers in example implementations. The free end 12 of the flexure plate 13 has an edge surface 18, with the counter surface 15 facing the edge surface 18 across the gap 17. The counter surface 15 is formed on a wall 19 of the recess 21 formed around the flexure plate 13. The wall 19, and thus the counter surface 15, have a curvature such that a separation distance between the counter surface 15 and the edge surface 18 remains substantially constant for movement of the edge surface 18 as a result of flexure of the flexure plate. It will be appreciated by a person skilled in the art that the movement of the flexure plate can be determined e.g. through simulation, and the wall 19 and counter surface 18 can be shaped accordingly to maintain the separation distance to the edge surface substantially constant during the movement.

Both the edge surface 18 of the flexure plate 13 and the counter surface 15 include a plurality of conductor layers 23, 25 disposed in a plane substantially perpendicular to the flexure direction 14. The conductor layers 23, 25 may comprise conductive thin-film layers or super-lattice type structures embedded in the flexure plate 13 and the wall 19 of the substrate 11, and extending through to respective edge portions 27, 29 of the substrate 11. In FIG. 1a, two such layers 23 are shown for the flexure plate 13, and twelve such layers 25 for the counter surface 15. However, it will be appreciated that different respective numbers of layers may be used in different implementations. The conductor layers 23, 25 may be in a thickness range from a single Mono Layer (ML) to hundreds of nm in different embodiments.

Suitable electrical contacts 26, 28, e.g. using wire bonding techniques, are provided on the edge portions 27, 29 for connecting the conductors 23, 25 to respective potential sources 31, 33 for applying an electrical potential difference across gap 17 between the edge surface 18 and the counter surface 15 to give rise to a detectable quantum tunnelling current. It will be appreciated that other techniques may be used to make contact to the conductor layers 23, 25, including, but not limited to fan-out techniques, slanting edge cut techniques, or etching for via connections to the conductor layers 23, 25. The current is detected by signal processing electronics 35, 37 understood in the art and incorporated in the potential sources 31 and 33 respectively, in the described embodiment.

As described in international patent publications WO 00/14476 and WO 2004/094956, the contents of which are hereby incorporated by cross-reference, the quantum tunnelling current between two surfaces is a function of the lateral overlap between opposing conductors. The lateral overlap influences the wave-function overlap for the tunnelling across the gap between the respective conductors. It has been recognized by the present inventors that the quantum tunnelling current between the edge surface 18 and the counter surface 15 in the described embodiment is a sensitive function of the tunnelling potential, the curvature of the flexure plate 13 under a force, and the curvature to of the counter surface 15. More particular, it has been recognised by the inventors that choosing the curvature of the counter surface 15 such that a separation distance between the counter surface 15 and the edge surface 18 remains substantially constant for movement of the edge surface 18 as a result of flexing of the flexure plate 13, the tunnelling current is not an exponential function of degree of flexing. Rather, a sinusoidal or substantially linear relationship can be realised in the described example embodiment. The described embodiment takes advantage of this non-exponential relationship for accurate measurement and monitoring of fine displacements, and in particular of fine incremental displacements.

Figure 2:
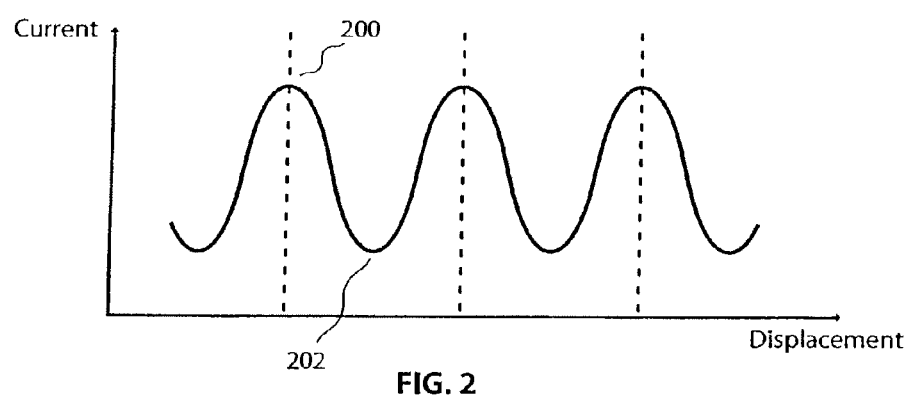
FIG. 2 shows a schematic plot illustrating an example of the relationship between the output tunnelling current and the measured relative positions of an edge surface and a counter surface in an example embodiment.

In the described embodiment, the tunnelling current is detected by the signal processing electronics 35, 37 for the respective conductors 23, 25 of the flexure plate 13 and the counter surface 15 respectively, and digital signal processed. The conductors 23, 25 are separated by respective insulating or semiconductor material layers 39, 41. FIG. 2 illustrates the relationship of the quantum tunnelling current against displacement during the operation of the described embodiment in the case that each of the edge surface 18 and the counter surface 15 include a plurality of parallel conductor layers 23, 25 respectively, each having the same spacing from neighbouring conductors. The quantum tunnelling current will exhibit maxima 200 when respective conductors of the edge surface 18 and the counter surface 15 are aligned, and minima 202 when there is low overlap between the respective conductors.

Figure 1B:
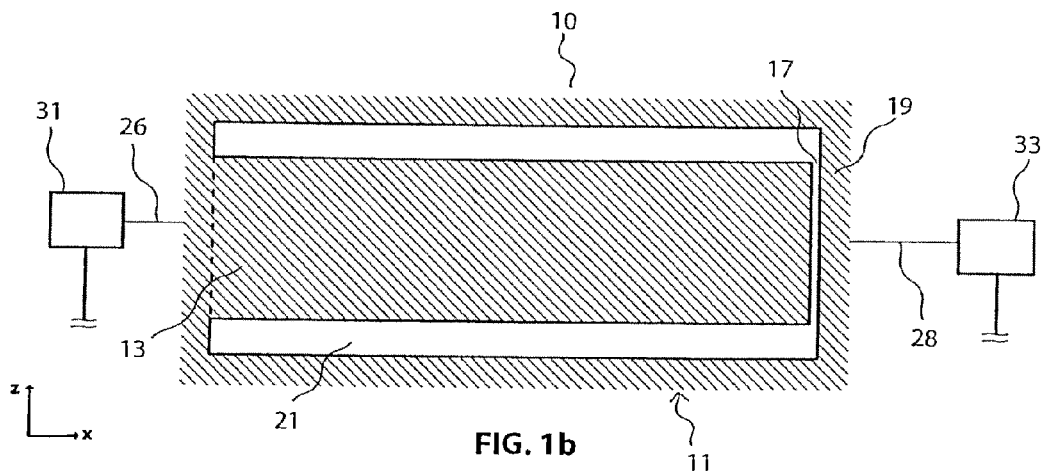
Figure 1C:
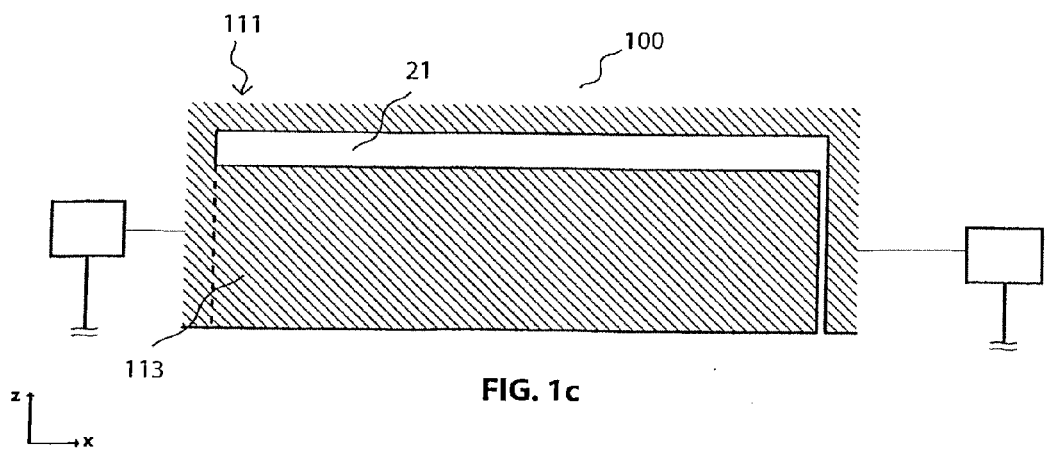
FIG. 1c shows a schematic top view of a modification of the sensor device of FIG. 1a in another example embodiment.

FIG. 1b shows a schematic to view of the embodiment 10, illustrating the recess 21 underneath the flexure plate 13, with the recess 21 being enclosed on both longitudinal sides by the substrate 11. As shown in FIG. 1c, in a modified embodiment 100, the recess 21 underneath the flexure plate 113 is enclosed on only one longitudinal side by a substrate 111.

In one application, the described embodiment can act as a cantilever in an Atomic Force Microscope (AFM) and serve as an incremental displacement sensor. When utilized in an AFM as cantilever with in-built capacity to measure bending via changes in tunnelling current, the described embodiment can eliminate the need for optical sensing methods involving laser beams, interferometers and photodetectors to measure cantilever bending in AFM.

Figure 3:
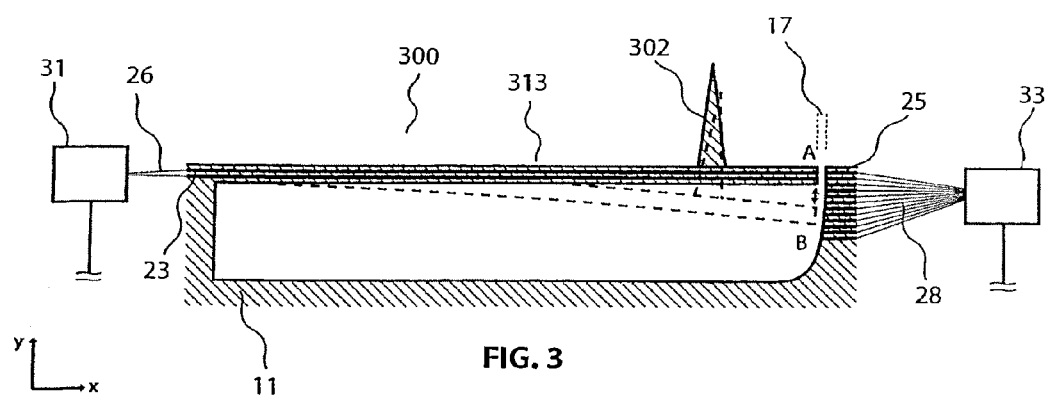
FIG. 3 shows a schematic cross-sectional view of a sensor device according to another embodiment.

FIG. 3 show a schematic cross-sectional and a schematic perspective view respectively of a modification of the embodiments of FIGS. 1a and b or FIG. 1c. More particular, the modified sensor device 300 comprises a tip 302 formed on a top surface 304 of the flexure plate 313. The same numerals have been used in FIG. 3 to indicate identical components between the embodiments. The tip 302 can be manufactured by various known techniques, including, but not limited to, beam induced deposition, ion beam deposition, or beam etching of the tip structure 302. The sensor device 300 may be incorporated in an AFM system for accurate measurement and monitoring of fine displacements, and in particular of fine incremental displacements, without the need for optical sensing methods involving laser beams, interferometers and photodetectors to measure cantilever bending, as mentioned above.

The embodiments shown in FIGS. 1a and b, FIG. 1c, and FIG. 3 can be manufactured using known processing techniques. For example, but not limiting, the conductors 23, 25 and insulating or semiconductor material layers 39, 41 may be formed on a substrate wafer 11 using molecular beam epitaxy (MBE) to form a super lattice structure, i.e. a vertical stack of alternating conductive and insulating layers on the substrate wafer 11. Photolithography followed by isotropic etching can be used to form a suspended beam or bridge and the recess 21, followed by severing of the beam to form a nanometer-range slot or gap between the beam and the wall 19, thus forming the flexure plate 13. The shaping of the wall 19 of the recess 21, including the counter surface 15, may for example be performed using focused ion beam (FIB) techniques, sacrificial etching, or other micro/nano-machining techniques. The shaping of the wall 19, including the counter surface 15, may be performed in one processing step with the formation of the body of the flexure plate 13, the flexure plate 13 then being released, for example using FIB cutting.

The severing of the beam may e.g. be performed using FIB techniques, directed perpendicular to the major surfaces of the substrate 11. It is noted that even if the line of the cut is not exactly straight, this does not create a problem because the resulting edge surface 18 and the counter surface 15 will still be perpendicular to the major surfaces of the substrate 11. Thus, the edge surface 18 and the counter surface 15 will move past each other in the direction perpendicular to the major surface of the substrate, without approaching each other significantly.

In another alternative, the beam may be severed not at one end but at some location along the beam, so that one portion of the beam remains part of the substrate portion, rather than becoming part of the flexure. For example, if the beam is cut at a central portion, there would be two flexures with opposed edge surfaces, with the edge surface of each flexure facing a counter surface on the other flexure.

Figure 4A:
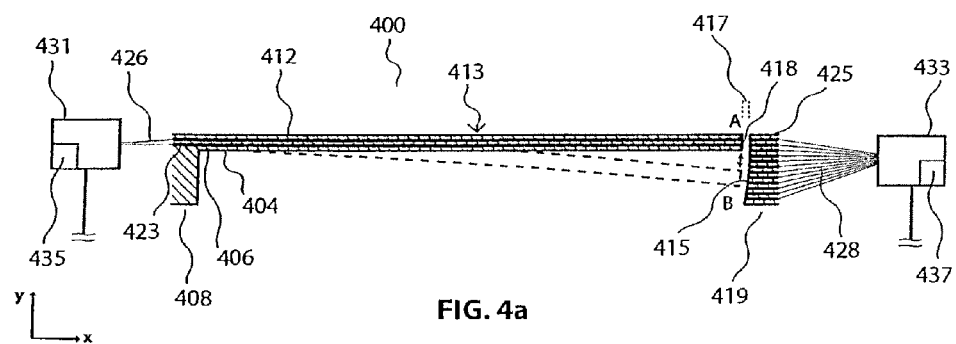
FIG. 4a shows a schematic cross-sectional view of a sensor device according to another embodiment.

FIG. 4a shows a schematic cross-sectional view of a sensor device 400 according to another embodiment. In the sensor device 400, the flexure plate 413 is in-plane with a surface 404 of a substrate 406. In this embodiment 400, the walls 408, 419 and the flexure plate 413 are built up on the substrate 406, and the sensor device 400 is then e.g. cut-out from the substrate 406. The sensor device 400 maintains its structural integrity by way of a frame portion remaining of the substrate 406 and around the flexure plate 413. In the sensor device 400, the flexure plate 413 is exposed from both sides of the major surfaces of the substrate 406, which can advantageously be exploited in a variety of sensing applications. In the embodiment 400 shown in FIGS. 4a to c, a top surface 412 of the flexure plate 413 is level with the frame portion of the substrate 406. The sensing operation of the device 400 again involves application of a potential difference between conductor layers 423, 425 of an edge surface 418 of the flexure plate 413 and a counter surface 415 on the wall 419 respectively, across the gap 417, utilising respective potential sources 431, 433, and signal processing electronics 435, 437.

Figure 4B:
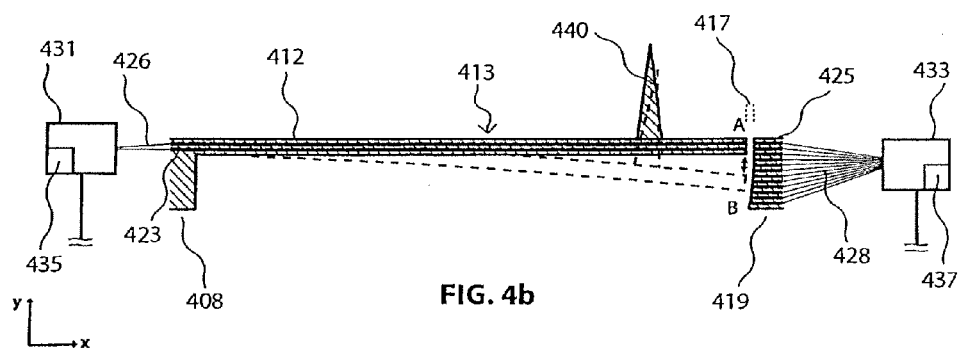
FIG. 4b shows a schematic cross-sectional view of a modification of the sensor device of FIG. 4a in another embodiment.

In a modification of the embodiment shown in FIG. 4a, FIG. 4b shows incorporation of a tip 440 on the top surface 412 of the flexure plate 413. In FIG. 4b, identical components compared to the embodiment shown in FIG. 4a are identified by the same numeral. The tip 440 can be formed using the tip-forming techniques described above with reference to FIG. 3.

Figure 5:
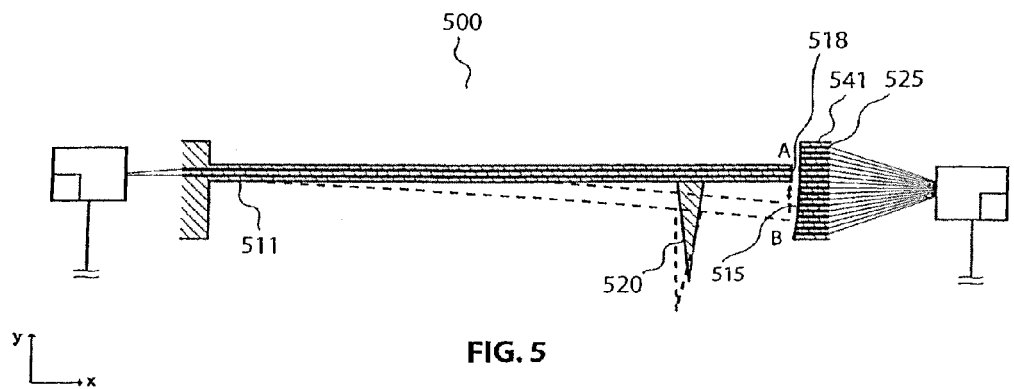
FIG. 5 shows a schematic cross-sectional view of a sensor device according to another embodiment.

FIG. 5 shows another modification of the embodiment shown in FIG. 4. More particular, in the sensor device 500, the counter surface 515, including a stack of alternating conductive layers 525 and insulating material layers 541 extends above and below the quiescent level (i.e. the substrate 511 level) of the flexure plate 513, allowing measurement of quantum tunnelling sensing signals for movement of the flexure plate 513 above and below the quiescent level. The curvature of the counter surface 515 is chosen such that a separation distance between the counter surface 515 and the edge surface 518 remains substantially constant for movement of the edge surface 518 as a result of flexing of the flexure plate 513, both above and below the quiescent level. In the embodiment shown in FIG. 5, a tip 520 is formed on a bottom surface of the flexure plate 513, using the tip-forming techniques as described above with reference to FIG. 3.

Figure 6:
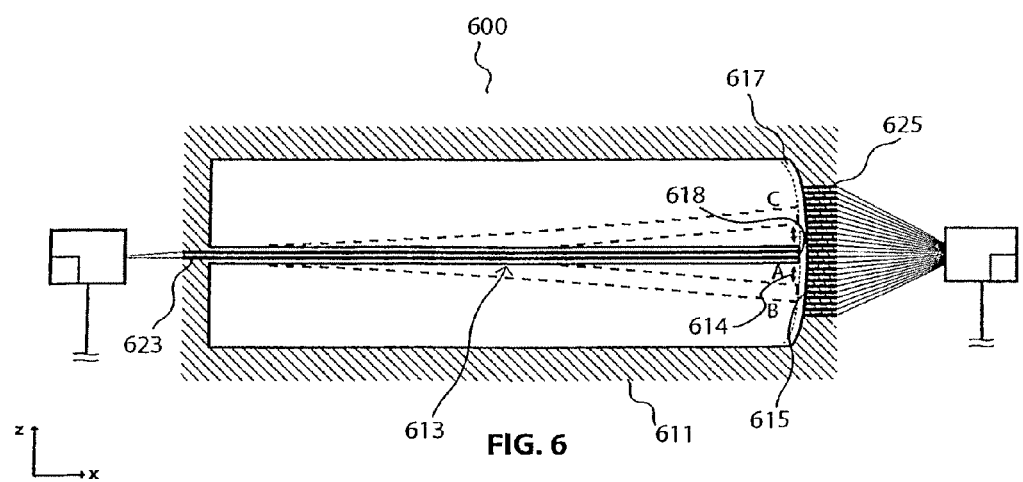
FIG. 6 shows a schematic top view of a sensor device according to another embodiment.

FIG. 6 shows a schematic top view of another sensor device 600. Here, the sensor device 601 comprises a flexure member in the form of a vertically disposed flexure plate 613, configured to flex along a direction in-plane with a substrate structure 611 of the sensor device 600. The flexure plate 613 includes a plurality of conductor layers 623 extending to an edge surface 618, while a counter surface 615 comprises a plurality of conductor layers 625. The conductor layers 623, 625 are disposed in a plane substantially perpendicular to a flexure direction 614 of the flexure plate 613. The counter surface 615 has a curvature such that a separation distance between the counter surface 615 and the edge surface 618 across gap 617 remains substantially constant for movement of the edge surface 618 as a result of flexure of the flexure plate 613.

Figure 7:
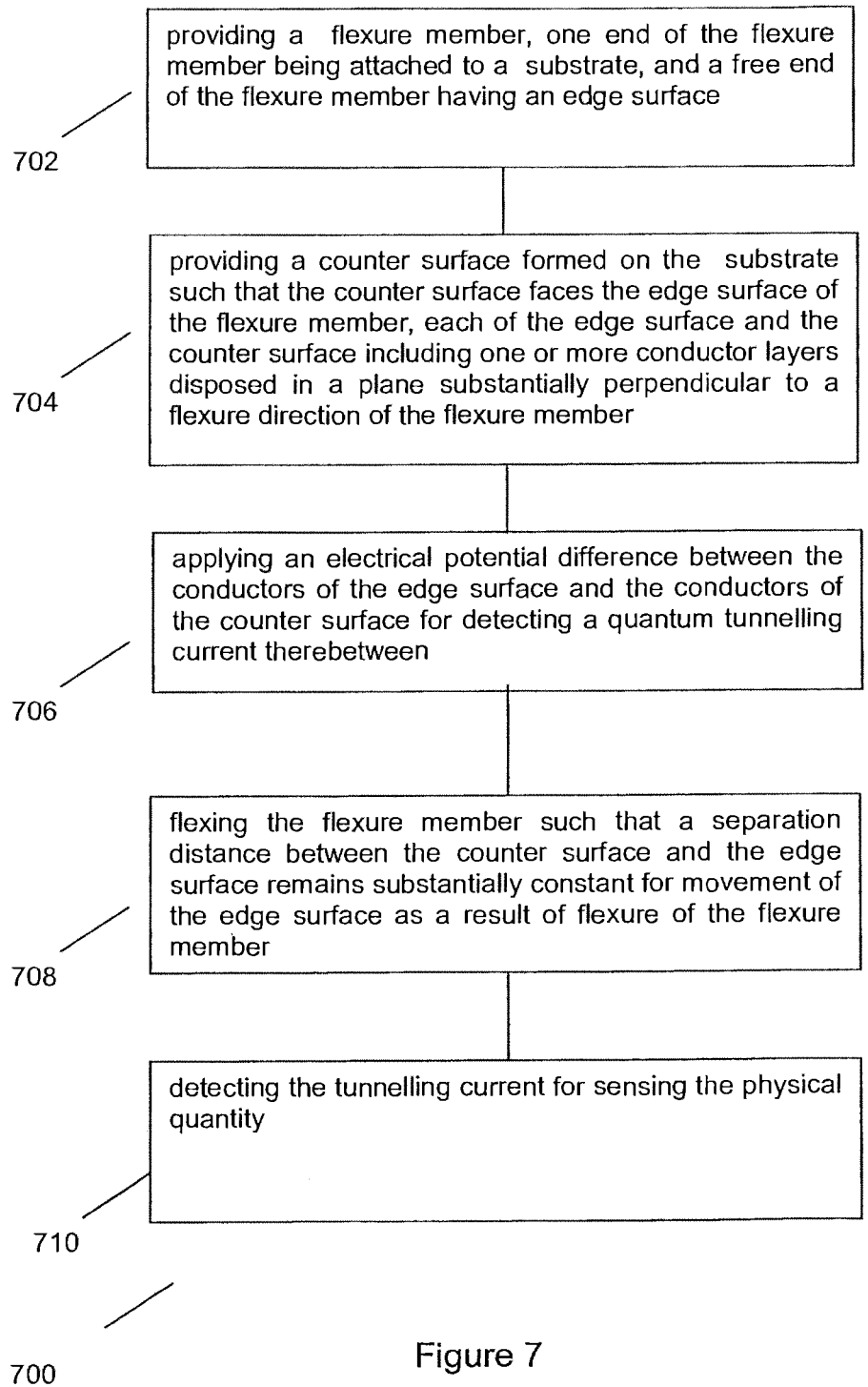
FIG. 7 shows a flowchart illustrating a method of sensing a physical quantity according to an example embodiment.

FIG. 7 shows a flowchart 700 illustrating a method of sensing a physical quantity according to an example embodiment. At step 702, a flexure member is provided, one end of the flexure member being attached to a substrate, and a free end of the flexure member having an edge surface. At step 704, a counter surface formed on the substrate is provided such that the counter surface faces the edge surface of the flexure member, each of the edge surface and the counter surface including one or more conductor layers disposed in a plane substantially perpendicular to a flexure direction of the flexure member. At step 706, an electrical potential difference is applied between the conductors of the edge surface and the conductors of the counter surface for detecting a quantum tunnelling current therebetween. At step 708, the flexure member is flexed such that a separation distance between the counter surface and the edge surface remains substantially constant for movement of the edge surface as a result of flexure of the flexure member. At step 710, the tunnelling current is detected for sensing the physical quantity, wherein movement of the flexure member or vibratory properties of the flexure member are coupled to the physical quantity.

Figure 8:
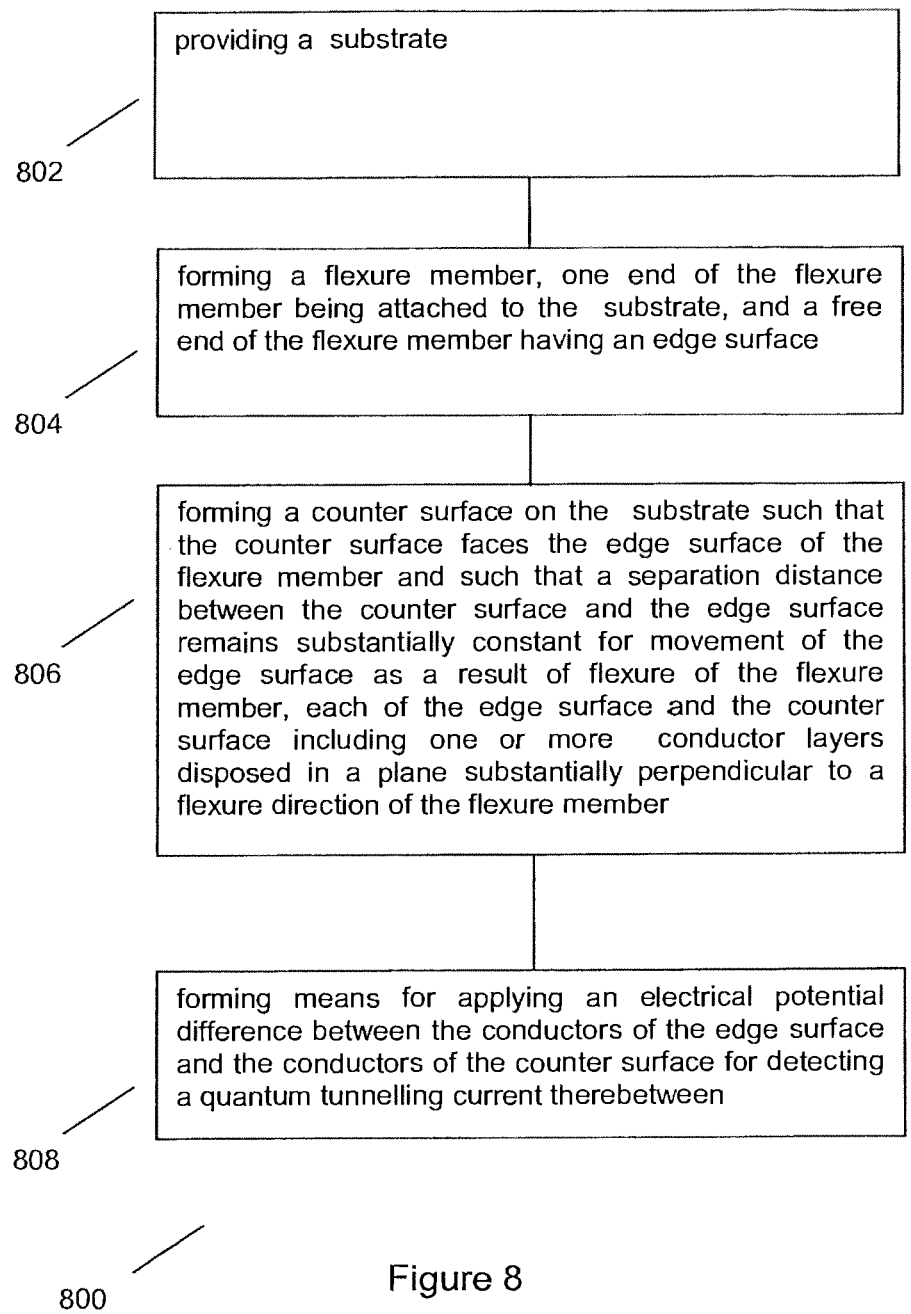
FIG. 8 shows a flowchart illustrating a method of fabricating a sensor device according to an example embodiment.

FIG. 8 shows a flowchart 800 illustrating a method of fabricating a sensor device according to an example embodiment. At step 802, a substrate is provided. At step 804, a flexure member is formed, one end of the flexure member being attached to the substrate, and a free end of the flexure member having an edge surface. At step 806, a counter surface is formed on the substrate such that the counter surface faces the edge surface of the flexure member and such that a separation distance between the counter surface and the edge surface remains substantially constant for movement of the edge surface as a result of flexure of the flexure member, each of the edge surface and the counter surface including one or more conductor layers disposed in a plane substantially perpendicular to a flexure direction of the flexure member. At step 808, means for applying an electrical potential difference between the conductors of the edge surface and the conductors of the counter surface for detecting a quantum tunnelling current therebetween are formed.

The described embodiments can act as an acceleration sensor, sensitive to accelerations parallel to the flexure direction. These accelerations cause the flexure element to flex due to inertia.

In another application of the described embodiments, linear vibratory motion transversing the flexure plate may be detected, causing the flexure element to flex due to inertia. The described embodiments can function at high frequencies and hence can be used as sensors for high frequency vibrations, by detecting the peaks in quantum tunnelling current as the edge surface oscillates relative to the counter surface. This allows the period of the oscillatory motion to be determined. Accordingly, the frequency can also be determined by taking the reciprocal of the period or by performing harmonic analysis of signal time series.

Another application of the described embodiments is as flow meters in which the flexure element projects into and responds to the flow.

It will be appreciated that the described embodiments can be generally applied to the measurement of any quantities coupled to displacement of the edge surface of the flexure element. Optionally, means may be provided on the flexure element for coupling the motion of the flexure element to physical quantities to be measured.

For example, if a bimetallic strip (bimorph) is formed on the flexure element, such a modified embodiment can act as a thermometer.

In another example, a surface of the flexure element may be made reactive to, or absorbent of, certain molecular species, so that when that species is present in the ambient atmosphere, the mass of the flexure element changes, causing a detectable variation in the position of the edge surface 14 (e.g. due to gravity) or in the vibratory properties of the flexure element. Thus, such a modified embodiment may be used to detect the adsorbed amount or mass of the molecular species.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

For example, the flexure element may be shaped so that it is not longitudinally symmetric.

The invention claimed is:

1. A sensor device comprising:
    a substrate;
    a flexure member, wherein a first end of the flexure member is attached to the substrate, and wherein a second end of the flexure member includes an edge surface;
    a counter surface formed on the substrate such that the counter surface faces the edge surface of the flexure member, wherein a separation distance between the counter surface and the edge surface is configured to remain substantially constant for movement of the edge surface as a result of flexure of the flexure member;
    a potential source configured to apply an electrical potential difference between the edge surface and the counter surface; and
    a signal processing device configured to detect a quantum tunnelling current between the edge surface and the counter surface.

2. The device of claim 1, wherein a flexure direction of the flexure member is substantially perpendicular to the substrate.

3. The device of claim 1, wherein a flexure direction of the flexure member is substantially parallel to the substrate.

4. The device of claim 1, wherein the flexure member is formed across a recess formed in the substrate, and wherein the counter surface is formed as part of a wall structure of the recess.

5. The device of claim 4, wherein the recess comprises an exposed longitudinal edge along at least one side of the substrate.

6. The device of claim 5, wherein one side of the flexure member is aligned with the exposed longitudinal edge of the recess.

7. The device of claim 4, wherein the recess is laterally enclosed along all sides of the recess.

8. The device of claim 1, further comprising a tip formed on a surface of the flexure member.

9. The device of claim 1, wherein the flexure member and the counter surface are built up on a surface of the substrate, and wherein a frame portion of the substrate extends around at least one longitudinal side of the flexure member.

10. The device of claim 1, wherein the counter surface extends below, above, or both below and above a quiescent level of the flexure member along a flexure direction of the flexure member.

11. A method comprising:
applying an electrical potential difference to a sensor device, wherein the sensor device includes a flexure member, wherein a first end of the flexure member is attached to a substrate and a second end of the flexure member comprises an edge surface, wherein the sensor device further includes a counter surface formed on the substrate such that the counter surface faces the edge surface of the flexure member, wherein each of the edge surface and the counter surface comprise one or more conductor layers, and wherein the electrical potential difference is applied between the one or more conductor layers of the edge surface and the one or more conductor layers of the counter surface;
flexing the flexure member such that a separation distance between the counter surface and the edge surface remains substantially constant for movement of the edge surface as a result of flexure of the flexure member; and
detecting a tunnelling current for sensing a physical quantity, wherein movement of the flexure member or vibratory properties of the flexure member are coupled to the physical quantity.

12. A method comprising:
forming a flexure member having a first end and a second end, wherein the first end is attached to a substrate and the second end includes an edge surface;
forming a counter surface on the substrate such that the counter surface faces the edge surface of the flexure member, wherein each of the edge surface and the counter surface include one or more conductor layers, and wherein a separation distance between the counter surface and the edge surface is configured to remain substantially constant for movement of the edge surface as a result of flexure of the flexure member; and
forming a potential source that is configured to apply an electrical potential difference between the one or more conductor layers of the edge surface and the one or more conductors of the counter surface for detecting a quantum tunnelling current between the edge surface and the counter surface.

13. The device of claim 1, wherein the edge surface comprises one or more conductor layers disposed in a plane that is substantially perpendicular to a flexure direction of the flexure member.

14. The device of claim 13, wherein the one or more conductor layers of the edge surface extend through to respective edge portions of the substrate.

15. The device of claim 13, further comprising one or more insulating layers between the one or more conductor layers of the edge surface.

16. The device of claim 1, wherein the counter surface comprises one or more conductor layers disposed in a plane that is substantially perpendicular to a flexure direction of the flexure member.

17. The device of claim 16, wherein the one or more conductor layers of the counter surface extend through to respective edge portions of the substrate.

18. The device of claim 16, further comprising one or more insulating layers between the one or more conductor layers of the counter surface.

19. The device of claim 1, wherein the sensor device comprises a cantilever in an atomic force microscope.

20. The device of claim 1, wherein the sensor device comprises an acceleration sensor or a high frequency vibration sensor.

21. The device of claim 1, further comprising a bimetallic strip formed on the flexure member.

22. The device of claim 1, wherein the flexure member is reactive to or absorbent of a molecular species such that a mass of the flexure member changes in the presence of the molecular species.

23. The device of claim 22, wherein the change in the mass of the flexure member results in a variation of a position of the edge surface or in vibratory properties of the flexure member.

24. The method of claim 11, wherein the one or more conductor layers of the edge surface and the one or more conductors of the counter surface are disposed in a plane that is substantially perpendicular to a flexure direction of the flexure member.

25. The method of claim 12, wherein the one or more conductor layers of the edge surface and the one or more conductor layers of the counter surface are disposed in a plane that is substantially perpendicular to a flexure direction of the flexure member.

* * * * *